United States Patent [19]

Fau et al.

[11] Patent Number: 4,791,029
[45] Date of Patent: Dec. 13, 1988

[54] AQUEOUS EMULSIONS OF ORGANOPOLYSILOXANE COMPOSITIONS ADAPTED FOR COATING FLEXIBLE SUBSTRATES

[75] Inventors: Alain Fau, Tassin La Demi-Lune; Gerard Fillippi, La Mulatiere; Robert Violland, Lyons, all of France

[73] Assignee: Rhone-Poulenc Chimie, Courbevoie, France

[21] Appl. No.: 66,030

[22] Filed: Jun. 24, 1987

[30] Foreign Application Priority Data

Jun. 24, 1986 [FR] France ................................ 86 09310

[51] Int. Cl.$^4$ ................................................ B32B 9/04
[52] U.S. Cl. .................................... 428/447; 427/387; 524/375; 524/376; 524/366; 524/377; 524/457; 524/459; 524/757; 524/761; 524/755; 524/762; 528/15; 528/31; 528/32; 525/100
[58] Field of Search .................... 528/32, 15, 31; 524/375, 376, 377, 366, 459, 457, 757, 761, 762, 755; 525/100; 428/447; 427/387

[56] References Cited

U.S. PATENT DOCUMENTS

| | | | |
|---|---|---|---|
| 3,445,420 | 5/1969 | Kookootsedes et al. | 528/31 |
| 3,527,659 | 9/1970 | Keil | 528/41 |
| 3,900,617 | 8/1975 | Grenoble | 528/32 |
| 3,957,717 | 5/1976 | Harada et al. | 260/37 |

FOREIGN PATENT DOCUMENTS 0169098  1/1986  European Pat. Off. .
2016494A  9/1979  United Kingdom .

Primary Examiner—Melvyn I. Marquis
Attorney, Agent, or Firm—Burns, Doane, Swecker & Mathis

[57] ABSTRACT

Aqueous emulsions of crosslinkable polyaddition organopolysiloxane compositions, well adapted for the thin layer coating of flexible substrates to impart water-repellency and nonadherency thereto, comprise a first aqueous emulsion A including end-vinylated polysiloxanes, a vinylated cyclotrisiloxane, a hydroorganodiorganopolysiloxane, a polyvinyl alcohol and a polyalkylene glycol alkyl ether or alkylphenyl ether, and a second aqueous emulsion B which comprises a catalytically effective amount of a platinum group metal catalyst.

10 Claims, No Drawings

AQUEOUS EMULSIONS OF ORGANOPOLYSILOXANE COMPOSITIONS ADAPTED FOR COATING FLEXIBLE SUBSTRATES

CROSS REFERENCE TO RELATED APPLICATION

Copending application Ser. No. 065,902, filed concurrently herewith and assigned to the assignee hereof.

BACKGROUND OF THE INVENTION

1. Field of the Invention

The present invention relates to novel aqueous emulsions of organopolysiloxane compositions capable of being crosslinked in thin layers by hydrosilylation, and to the use of such emulsions for coating supple or flexible materials such as textile fibers, paper, board members, plastic substrates, metal sheets, and the like, particularly in order to render these materials water-repellant and/or nonadhesive as regards sticky substances.

2. Description of the Prior Art

Compositions of the above basic type have long been known to the silicone industry and are described individually in a great many patents and patent applications.

They comprise crosslinking systems of the same type, namely:

(i) at least one organopolysiloxane containing at least two vinyl groups per molecule, each bonded to a silicon atom, and designated hereinafter as the "SiVi" group;

(ii) at least one organohydropolysiloxane containing at least three hydrogen atoms per molecule, each bonded to a silicon atom, designated hereinafter as the "SiH" group; and (iii) a catalytically effective amount of a platinum group metal compound for catalyzing the hydrosilylation reaction.

Thus, the use of a polyaddition aqueous emulsion to impart nonadhesiveness to paper is described in U.S. Pat. No. 3,527,659 (column 1, lines 25 to 28; column 2, lines 37 to 46; and column 3, lines 60 to 65).

The polyaddition aqueous emulsions in general, the inhibitory function of the platinum catalyst which is served by water and the production of a hardened composition on a substrate after the evaporation of water are described, furthermore, in the left-hand column on page 5 of French Pat. No. 1,528,464, corresponding to U.S. Pat. No. 3,445,420.

In the aforementioned passage, emphasis is placed on the fact that this formation of an aqueous emulsion can take place only under the conditions such that hydrolysis of the SiH groups occurs to but a minor extent.

U.S. Pat. No. 3,900,617 describes an aqueous emulsion comprising, as the vinylated diorganopolysiloxane, a diorganopolysiloxane blocked by a dimethylvinylsiloxyl group at both ends of the polymer. This patent also indicates that, in order to store the emulsion after its production, it is desirable to prepare two separate emulsions, one, designated component A hereinafter, comprising the vinylated diorganopolysiloxane and the hydrosilylation catalyst, and the other, designated component B hereinafter, comprising the hydrogenated diorganopolysiloxane.

The emulsifiers which can be employed are, in particular, polyvinyl alcohol in the case of component A and polyalkylene glycol ethyl ethers or alkylphenyl ethers in the case of component B.

French Pat. No. 2,338,316 also teaches that the emulsion should be stored as two separate components A and B, which are admixed on an ad hoc basic at the point in time of ultimate use and additionally stipulates that during the preparation of component A the platinum catalyst should be incorporated in the vinylated diorganopolysiloxane before it is emulsified.

Marketing in the form of these two components A and B such as described in the above two patents is not without disadvantages.

In the first place, the amount of water to be conveyed is large, and this increases transportation costs. Furthermore, and above all, the user must mix the quantities of components A and B before each use in well-determined proportions in order to provide both the required SiH/SiVi ratio and the amount of platinum catalyst.

It would be much more convenient for the user to have available an aqueous emulsion packaged as two components, the first component A comprising the polysiloxane containing SiVi and the polysiloxane containing SiH as an aqueous emulsion, preferably concentrated and extremely stable in storage and, as a second component B, an aqueous catalyzing emulsion of the hydrosilylation catalyst. In order to prepare the final composition, the user would then only have to dilute, if desired, a certain quantity of component A and to then add just the necessary amount of catalyzing emulsion of component B, and this would make it possible to eliminate possible risks of errors in the SiH/SiVi ratio and the amount of catalyst.

SUMMARY OF THE INVENTION

Accordingly, a major object of the present invention is the provision of an improved composition of the above type, presented in two components or packets, the first component A comprising the polysiloxane containing the SiH group and the polysiloxane containing the SiVi group as an aqueous emulsion which is highly stable in storage (stability of at least one year) and is concentrated, if desired, with the second component B comprising the catalyzing emulsion.

As best as can be determined, compositions of this type which are highly stable in storage, comprising components A and B as aforesaid, have never been described in this art, because a component A of such type has until now been considered to be unstable in storage and loses reactivity. On the other hand, this problem of stability and of loss of reactivity in storage has been solved consistent herewith, firstly through the judicious selection of specific polysiloxanes in the component A, as well as in respect of the siloxane containing the SiVi group and of polysiloxanes containing the SiH group and, secondly, through the selection of the emulsifying agents.

All percentages and parts in the following text are on a weight basis, unless otherwise indicated.

Briefly, the present invention features an organopolysiloxane composition comprising, prior to use, two separate aqueous emulsions A and B.

The aqueous emulsion A comprises:

($V_1$) a substantially linear diorganopolysiloxane blocked by a vinyldiorganosiloxyl group at each end of its polymer chain;

($V_2$) a substantially linear random vinylorganodiorganopolysiloxane copolymer blocked at each end of its polymer chain by a vinyldiorganosiloxyl or triorganosiloxyl group containing at least three SiVi groups per molecule;

(H₁) a substantially linear random diorganoorganohydropolysiloxane copolymer comprising at least three SiH groups per molecule and blocked at each end of its polymer chain by a triorganosiloxyl or diorganohydrosiloxyl group;

(V₃) a vinylated cyclotrisiloxane of the formula:

[R(CH₂=CH)SiO]₃ in which R is a $C_1$-$C_4$ alkyl radical, a phenyl radical or a 3,3,3-trifluoropropyl radical, with the amount of (V₃) being such that from 0.5 to 60%, preferably from 1.5 to 20%, of the number of SiVi groups in the composition are contributed thereby;

(E) an emulsifier comprising a mixture of polyvinyl alcohol (E₁) and at least one ether (E₂) selected from among polyalkylene glycol alkyl ethers and polyalkylene glycol alkylphenyl ethers; with the proviso that at least 90% of the number of organic radicals in the polysiloxanes (V₁), (V₂) and (H₁) are methyl radicals, the other organic radicals being ethyl, propyl, phenyl and-/or 3,3,3-trifluoropropyl radicals, and the amounts of (V₁), (V₂), (V₃) and (H₁) are such that the numerical ratio of the SiH groups to the SiVi groups ranges from 0.5 to 5 and preferably from 0.7 to 2.

The aqueous emulsion B comprises a catalytically effective amount of a platinum group compound.

All of the organic radicals in the polymers (V₁), (V₂), (V₃) and (H₁), other than the SiH and SiVi groups, are preferably methyl radicals.

DETAILED DESCRIPTION OF THE PREFERRED EMBODIMENTS OF THE INVENTION

More particularly according to the present invention, the polymers (V₁) are well-known materials. Consistent herewith, it is preferable that these polymer should be fluids having a viscosity of from 20 to 20,000, preferably from 50 to 500 mPa.s at 25° C.

The polymers (V₁) may thus correspond to the formula:

(CH₂=CH)R₂Si—O—(R₂Si—O)ₘSiR₂(CH₂=CH)

wherein the radicals R, which are identical or different, are as defined above.

The copolymers (V₂) are also well known to this art. Their viscosity is not critical and within the scope of the present invention it is possible to use fluids having viscosities which are preferably higher than 20 mPa.s at 25° C. and which may range up to viscosities capable of attaining 30,000,000 mPa.s at 25° C., the copolymers (V₂) then being resins at viscosities higher than 1,000,000 mPa.s.

Like the polysiloxane (V₁), the polysiloxane (V₂) may be a single type of polysiloxane or a mixture of several types of polysiloxanes having different viscosities.

The polysiloxanes (V₂) may thus correspond to the formula:

R'R₂Si—O—(R₂Si—O)ₒ—[(CH₂=CH)RSi—O]ₚ—SiR₂R'

The radicals R, which are identical or different, are as defined above, R' being R or a vinyl radical, and o and p being integers, the values of which being selected as a function of the required viscosities.

The copolymers (H₁) are also well known materials. According to this invention, the copolymers most particularly preferred have a viscosity of from 5 to 1,500, preferably from 20 to 150 mPa.s at 25° C.

The copolymers (H₁) may thus correspond to the formula:

YR₂Si—O—(R₂Si—O)_q(YRSi—O)_rSiR₂Y wherein the radicals R are as defined above, with the proviso that they may also be vinyl groups, the radicals Y denoting a radical R or a hydrogen atom, and q and r being integers, the values of which being selected as a function of the required viscosities. The integer q preferably ranges from 1 to 100 and r from 3 to 120.

Up to 50% of the weight of the copolymers (H₁) may be replaced by resinous branched hydropolysiloxanes having a viscosity of from 2 to 10,000 mPa.s at 25° C. and including a combination of recurring units selected from among those of the formulae $R_3SiO_{0.5}$, $R_2SiO$, $RSiO_{1.5}$, $SiO_2$, $HR_2SiO_{0.5}$, $HRSiO$, and $HSiO_{1.5}$, the radicals R being defined as in (H₁) above.

The cyclotrisiloxanes (V₃) too are well known materials, the preparation of which is described in detail in U.S. Pat. Nos. 3,607,898, 3,763,212 and 3,989,733 and in published Japanese Patent Application Kokai No. 74/124,067.

It is possible, nevertheless, to use mixtures of vinylated cyclotrisiloxanes with their higher cyclotetrasiloxane and cyclopentasiloxane, etc., homologs, without separating them beforehand, provided that the minimum content of SiVi group in the composition originating from the vinylated trimer is properly observed.

The polyvinyl alcohol (E₁) is a granular solid polymer which may also contain acetate groups. Typically, the percentage of hydrolysis is high, exceeding 85%. It is possible, for example, to use Rhodoviol ®25/140 marketed by Rhône-Poulenc or Elvanol ®50-42 marketed by DuPont. From 1 to 20 parts of polyvinyl alcohol are typically employed per 100 parts of the polymers (V₁) to (V₃).

The other nonionic emulsifying agent (E₂) is preferably employed in a proportion of 0.1 to 10 parts, preferably from 0.15 to 5 parts, per 100 parts of copolymer (H₁).

It is selected from among polyalkylene glycol alkyl ethers and, primarily, alkylphenyl ethers. The alkyl radical, linear or branched, contains from 1 to 15 carbon atoms. The number of recurring units of the formula CH₂CH₂O in the polyoxyethylene chain sequence has a great influence on the emulsifying properties. It is preferably greater than 5 and lower than 30. It is possible to use a mixture of several emulsifying agents (E₂) differing from each other only in the number of CH₂CH₂O recurring units. Exemplary of the emulsifiers (E₂), representative are: Cemulsol ®O.N 10-20 marketed by Rhône-Poulenc or Tergipol ®NP-40 marketed by Union Carbide Corporation.

Insofar as component B is concerned, the emulsifier (E₁) is highly suitable for emulsifying the catalyst. Up to approximately 50% by weight of polymer (V₁) may be incorporated and emulsified in the component B.

As the catalyst (C), compounds of a platinum group metal may be used, in particular their salts and complexes, especially the platinum/olefin complexes as described in U.S. Pat. Nos. 3,159,601 and 3,159,662, reaction products of platinum derivatives with alcohols, aldehydes and ethers described in U.S. Pat. No. 3,220,972, the platinum/vinylsiloxane catalysts described in French Pat. Nos. 1,313,846 and its addition thereto, 88,676, and French Pat. No. 1,480,409, the siloxane ligand complexes described in U.S. Pat. Nos. 3,715,334, 3,775,452 and 3,814,730, and the organic ligand complexes described in European Pat. Nos. 57,459, 188,978 and 190,530, as well as a rhodium catalyst such as described in U.S. Pat. Nos. 3,296,291 and 3,928,629.

The preferred platinum group metals are platinum and rhodium. Although less active, ruthenium can also be used, being less costly.

The composition may optionally contain a catalyst inhibitor, added in such amount that it inhibits the catalyzing action of platinum at ambient temperature, but this inhibitory action being lost during the crosslinking treatment. Suitable inhibitors are, for example, dialkyl dicarboxylates (U.S. Pat. No. 4,347,346), diallyl maleates (U.S. Pat. No. 4,256,870) and organic acetylenic compounds (U.S. Pat. No. 3,445,420 and published European Patent Application No. 146,422).

The amount of inhibitor typically ranges from 0.01 to 3.0%, preferably from 0.05 to 2.0%, based on the total weight of the silicone.

In the case of component A, water is typically employed in a proportion of 20 to 300 parts, preferably from 30 to 150 parts, per 100 parts of the polysiloxanes comprising the composition.

In the case of component B, the water content may be much higher, especially in the case where this component B is devoid of the polysiloxanes ($V_1$).

The present invention also relates to a preferred process for preparing the components A and B.

According to this process, component A is prepared by preparing a first emulsion $S_1$ by charging a mixture comprising the polysiloxanes ($V_1$), ($V_2$), ($V_3$), the emulsifier ($E_1$) and water through a colloid mill.

In a preferred alternative embodiment of the invention, up to approximately 50% by weight of the polymer ($V_1$) may be incorporated in component B and/or up to approximately 70% by weight of ($E_2$) may be added to $S_1$, preferably from 20 to 60% of ($E_2$).

A second emulsion $S_2$ is prepared by charging a mixture comprising the polysiloxane ($H_1$) and ($E_2$) or the remaining fraction of ($E_2$) through a colloid mill.

The emulsions $S_1$ and $S_2$ are then intimately admixed and they then constitute component A which, surprisingly and unexpectedly, is stable in storage, even in a concentrated form, for one year and even longer.

In order to prepare component B, the catalyst compound with the emulsifier ($E_1$) and water and, preferably, with up to 50% of ($V_1$), are processed through a colloid mill.

In another alternative embodiment, the catalytic compound is incorporated beforehand in the fraction of ($V_1$) before the addition of water in accordance with the teachings of the aforementioned French Pat. No. 2,338,316.

Component B, which is preferably measured out beforehand such that it will typically contribute from 5 to 100 ppm, preferably from 10 to 60 ppm, of catalyst, calculated as the weight of metal based on the total weight of the polysiloxanes ($V_1$), ($V_2$), ($V_3$) and ($H_1$) employed in the composittion, namely, all of the polysiloxanes containing SiVi and SiH in the composition, is added to component A.

For example, from 2 to 20 parts of polyvinyl alcohol ($E_1$) may be used per 100 parts of polysiloxane containing SiVi and from 0.5 to 20 parts of emulsifier ($E_2$) may be used per 100 parts of polysiloxane ($H_1$).

The catalyzed aqueous emulsion compositions are stable for at least 24 hours at ambient temperature. As a result, they can remain in the supply tanks of coating machines for at least one working day.

They may be applied with the aid of means used on industrial paper-coating machines, such as air-knife or equalizing bar systems, etc. One deposited onto the supple substrates or materials, the aqueous emulsion compositions are cured in a few seconds during the crosslinking process, including travel through tunnel ovens heated to about 70°–220° C. The residence time in these ovens typically ranges from 3 to 20 seconds and, for a given oven length, it is a function of the speed at which the substrates travel. In addition, this crosslinking process may include a pass under UV irradiation or under an electron beam.

From 5 to 15 seconds at about 100°–130° C. should be allowed for producing a properly cured coating. This period includes the fraction of time required to evaporate water; this fraction is frequently greater than ½.

The crosslinking time of the compositions according to the invention is particularly short, essentially because of the presence of ($V_3$) in the composition.

The quantities of composition which are deposited onto the substrates can vary and depend on the solids content of the compositions and on the required water-repellency and non-adhesive properties. It is desirable that the quantities deposited should provide from 0.3 to 5.0 g of solids per $m^2$ of surface to be treated.

The solids consist of the constituents of the composition, with the exception of water and/or of the reaction products of these constituents.

The coatings produced in this manner impart to the substrates onto which they are applied very good non-adhesive and water-repellent properties which are retained over time. These coatings withstand rubbing very well, and consequently are not removed by abrasion when their substrate sheets (or tapes) are transferred over the return rolls of coating or adhesive-coating machines. Such rolls are made of materials, the surfaces of which are rough to a greater or lesser extent.

Furthermore, essentially by virtue of the presence of ($V_3$), these coatings are hard, while remaining sufficiently supple, and this greatly facilitates automatic machine punching of flexible adhesive-coated composites, especially papers.

The aqueous emulsion compositions according to the invention may be applied to any supple materials or substrates which will subsequently come into contact, for example, with substances which are sticky and/or which release moisture. These substrates may include the different varieties of paper (such as kraft paper of any degree of refining, glassine, parchment papers), board members, vegetable parchment, polyethylene- or carboxymethyl cellulose-coated papers, cellulose sheets, sheets of plastic materials such as those of polyethylene, polypropylene, polyethylene terephthalate, metal sheets, cloths based on synthetic fibers, on glass or on asbestos, non-woven fibrous materials, whether based on cellulose fibers or synthetic fibers, or on a mixture of such fibers.

The present invention also relates, therefore, to a process for coating these substrates to render them nonadhesive and/or water-repellent, and to the substrates, per se, coated in this manner.

The materials which have thus been rendered nonadhesive are employed as inserts, separators, papers and foils for transfers and packages of sticky materials such as confectionary, pastry, crude rubbers, pitches and bitumens, waxes, foodstuffs which release moisture such as fish, meat or cheese.

In particular, the coated papers may be used for packing deep-frozen foodstuffs. The foodstuffs do not adhere to their packaging even after a storage period of one year or longer at temperatures which may be as low as −70° C. In addition, these packages may be subjected, without disintegrating, to the stresses of fast-cooking methods for deep-frozen foodstuffs (temperature on the order of 300° C. in microwave ovens, steam-cooking); these techniques are employed, for example, in restaurants and supermarkets.

In order to further illustrate the present invention and the advantages thereof, the following specific examples are given, it being understood that same are intended only as illustrative and in nowise limitative.

EXAMPLE 1 AND COMPARATIVE EXAMPLES 2 AND 3

(a) The following constituents were intimately admixed:

(i) 100 parts of a compound $H_1$ or $H_2$, described below:

Compound $H_1$: dimethylmethylhydropolysiloxane copolymer blocked by a trimethylsiloxyl group at each end of its polymer chain and containing both dimethylsiloxyl recurring units and methylhydrosiloxyl recurring units distributed randomly and alternately along the silicone chain, having a viscosity of 60 mPa.s at 25° C.;

Compound $H_2$: methylhydropolysiloxane polymer blocked by a trimethylsiloxyl group on the silicone chain at each end of its polymer chain, having a viscosity of 50 mPa.s at 25° C.;

(ii) 8 parts of a 70/30, by weight, mixture of two polyoxyethylenated nonylphenols, one containing 10OCH$_2$—CH$_2$ recurring units and the other 20OCH$_2$—CH$_2$ recurring units, marketed by Rhône-Poulenc under the trademark Cemulsol®O.N 10-20; and (iii) 0.5 part of an aqueous solution containing 40% of acetic acid.

The mixture was emulsified in a colloid mill. The millbase was diluted by the addition of 43 parts of water; the product emulsion contained 60% of the hydrogenated organopolysiloxane compound $H_1$ or $H_2$.

(b) The following constituents were also intimately admixed:

(i) 231 parts of water;
(ii) 20 parts of a polyvinyl alcohol with a saponification value of 140 and having a viscosity of 25 mPa.s as a 4% solution in water at 25° C., marketed by Rhône-Poulenc under the trademark Rhodoviol®25/140.

To this mixture there were then added:
(iii) 1.5 parts of a 70/30 (by weight) mixture of the two polyoxyethylenated nonylphenols used under (a);
(iv) 350 parts of a random dimethylmethylvinylpolysiloxane copolymer containing methylvinylsiloxyl recurring units in the polymer chain and having vinyldimethylsiloxyl end groups, having a viscosity of approximately 500 mPa.s at 25° C. and approximately 3% of vinyl groups;
(v) 4 parts of a dimethylpolysiloxane blocked by a dimethylvinylsiloxyl group at each end of its polymer chain, having a viscosity of 5 mPa.s at 25° C., containing approximately 30% by weight of vinyl radicals; and
(vi) 10 parts of tetramethyltetravinylcyclotetrasiloxane (D$_4$Vi).

0 to 1 part of trimethyltrivinylcyclotrisiloxane (D$_3$Vi) was added to this composition and the entire mass was finely emulsified in a colloid mill. The millbase was diluted by adding 292.5 parts of water and the following materials were incorporated into the diluted millbase, simply by being stirred therein:

(1) 70 parts of the emulsion prepared under (a);
(2) 20 parts of monopropylene glycol.

The aqueous emulsion composition produced in this manner was very stable in storage. In particular, after storage for 6 months at 40° C. in a closed container, it showed no significant loss of SiH groups.

100 ppm of platinum (5 10$^{-3}$ gram-atom of platinum per kg of composition) were added to this emulsion in the form of a platinum complex prepared from chloroplatinic acid, as described below.

A platinum/triene complex was prepared by mixing:
(i) 1 part of H$_2$PtCl$_6$.6H$_2$O;
(ii) 5 parts of isopropanol;
(iii) 2 parts of sodium bicarbonate, NaHCO$_3$; and
(iv) 6 parts of β-myrcene.

The chloroplatinic acid was first dissolved in the isopropanol and then NaHCO$_3$ was added in small portions to avoid foaming, since carbon dioxide was released, and then the β-myrcene was added.

The reaction was under reflux for 20 minutes at approximately 80° C. with continuous stirring. The initial orange color changed to yellow. The reaction mixture was cooled to ambient temperature and the isopropanol was removed at 20° C. under a vacuum of 1.5 kPa. The inorganic impurities were precipitated in hexane and, after being filtered, the solution was concentrated at 40° C. under a vacuum of 0.1 to 1 kPa. An orange-red oil was obtained in 80% yield based on the total weight of platinum and of the initial reactants. A Cl/Pt ratio of 1.0 was obtained. The concentration of the complex was adjusted to 3% by diluting in toluene. This was the solution which was used subsequently.

This complex was employed in the form of an aqueous emulsion containing 2% of polyvinyl alcohol, as set forth under (b).

The mixture was stirred vigorously for several minutes at ambient temperature.

This catalyzed emulsion was then diluted by adding a sufficient amount of water to constitute a process bath containing 10% solids.

This bath was coated at a rate of 8 g/m$^2$ onto a kraft paper weighing 50 g/m$^2$, satin-surfaced.

The coating was applied using a Mayer equalizing bar, mounted on an industrial paper-coating machine.

The emulsion film covering the paper was simultaneously dried and cured by passing it for X seconds through a heated tunnel oven, the temperature near the paper being 110° C., thus providing the crosslinking time.

In this manner, a coated paper which had approximately 0.8 g/m$^2$ of a perfectly crosslinked thin coating on one face surface thereof was obtained.

An adhesive (pressure-sensitive) tape marketed as Tesa®4651 was applied to the coated face surface of the paper treated according to (d), and this application was maintained for 20 hours under a pressure of 70 g/cm$^2$. The force required to separate this tape was then measured using a tensometer, the rate of separation being 30 cm/minute. A separation force of 10 g was determined for a tape width of 1 cm. When an ultrahigh rate of separation of 300 m/min was employed, a separation force of 40 g was determined for a tape width of 1 cm.

In order to evaluate the stability of the catalyzed bath, a new coating was produced under the same conditions by using the treatment bath which had been aged for 24 hours. The stability of the bath was considered good, if the crosslinking time of the coating at 110° C. and if the nonadhesion performance obtained were identical with those at time 0 of the pot-life.

The Table below shows the accelerating effect of trimethyltrivinylcyclotrisiloxane on the crosslinking, without the presence of any detrimental effect on the stability of the bath (24 hours).

The stability of the uncatalyzed emulsion was monitored after the emulsion had been stored at 40° C. The crosslinking rate and the stability of the bath should remain constant.

The results are reported in the Table below.

From the Table, it will be seen that only Example 1, in accordance with the invention, exhibited a crosslinking time, a catalyzed bath stability and an uncatalyzed emulsion stability which were simultaneously highly satisfactory. The composition of Comparative Example 2, without $D_3Vi$, exhibited a crosslinking time which was much too long, and the composition of Comparative Example 3, with $H_2$ and with $D_3Vi$, had an uncatalyzed emulsion stability which was insufficient.

$$[R(CH_2=CH)SiO]_3$$

in which R is a $C_1$–$C_4$ alkyl radical, a phenyl radical or a 3,3,3-trifluoropropyl radical, and said vinylated cyclotrisiloxane being present in such amount as to contribute from 0.5 to 60% of the total number of SiVi groups to the composition; and (E) an emulsifier comprising a mixture of polyvinyl alcohol ($E_1$) and at least one polyalkylene glycol alkyl ether or polyalkylene glycol alkylphenyl ether ($E_2$);

wherein at least 90% of the organic radicals comprising the polysiloxanes ($V_1$), ($V_2$) and ($H_1$) are methyl radicals, with the remaining organic radicals being ethyl, propyl, phenyl or 3,3,3-trifluoropropyl radicals, and further wherein the amounts of ($V_1$), ($V_2$), ($V_3$) and ($H_1$) are such that the numerical ratio of the SiH groups to the SiVi groups ranges from 0.5 to 5.

2. A two-component organopolysiloxane composition, comprising the aqueous emulsion A as defined by claim 1, and an aqueous emulsion B which comprises a catalytically effective amount of a platinum group metal hydrosilylation catalyst.

3. The organopolysiloxane composition as defined by claims 1 or 2, wherein said vinylated cyclotrisiloxane contributes from 1.5 to 20% of the total number of SiVi groups thereto.

TABLE

| Example | Nature of the hydropolysiloxane | % of number of Vi originating from $D_3Vi$ | $D_3Vi$ parts per 1,000 | $D_4Vi$ parts per 1,000 | Crosslinking time at 110° C. in sec. | Stability of the catalyzed bath (hours) | Stability of the uncatalyzed emulsion |
|---|---|---|---|---|---|---|---|
| 1 | $H_1$ | 2 | 1 | 10 | 15 | >24 | ≧1 year |
| 2 | $H_1$ | 0 | 0 | 10 | ≧60 | >24 | ≧1 year |
| 3 | $H_2$ | 2 | 1 | 10 | 15 | >24 | <4 months |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An organopolysiloxane composition of matter, comprising an aqueous emulsion A that includes:
   ($V_1$) a substantially linear diorganopolysiloxane blocked by a vinyldiorganosiloxyl group at each end of the polymer chain thereof;
   ($V_2$) a substantially linear random vinylorganodiorganopolysiloxane copolymer blocked at each end of the polymer chain thereof by vinyldiorganosiloxyl or triorganosiloxyl group containing at least three SiVi groups per molecule;
   ($H_1$) a substantially linear random diorganoorganohydropolysiloxane copolymer containing at least three SiH groups per molecule and blocked at each end of the polymer chain thereof by a triorganosiloxyl or diorganohydrosiloxyl group;
   ($V_3$) a vinylated cyclotrisiloxane having the formula:

4. The organopolysiloxane composition as defined by claims 1 or 2, wherein the numerical ratio of the SiH groups to the SiVi groups ranges from 0.7 to 2.

5. The organopolysiloxane composition as defined by claims 1 or 2, wherein all organic radicals in the polymers ($V_1$), ($V_2$), ($V_3$) and ($H_1$), other than the SiH and SiVi groups, are methyl radicals.

6. The organopolysiloxane composition as defined by claims 1 or 2, wherein up to 50% of ($H_1$) comprises branched resinous hydropolysiloxanes having a viscosity ranging from 2 to 10,000 mPa.s at 25° C. and including recurring units of the formulae $R_3SiO_{0.5}$, $R_2SiO$, $RSiO_{1.5}$, $SiO_2$, $HR_2SiO_{0.5}$, $HRSiO$ and/or $HSiO_{1.5}$, in which R is defined as in ($H_1$).

7. The organopolysiloxane composition as defined by claim 2, wherein up to about 50% by weight of polymer ($V_1$) comprises said aqueous emulsion B.

8. The organopolysiloxane composition as defined by claims 1 or 2, in crosslinked state.

9. A flexible substrate having a thin layer coating, on at least one face surface thereof, of the organopolysiloxane composition as defined by claims 1 or 2.

10. A flexible substrate having a thin layer coating, on at least one face surface thereof, of the organopolysiloxane composition as defined by claim 8.

* * * * *